United States Patent Office 2,831,773
Patented Apr. 22, 1958

2,831,773

BEVERAGE

William Geisler, Tenafly, N. J., and Bernard E. Proctor, Cambridge, Mass., assignors, by mesne assignments, to C & C Super Corporation, New York, N. Y., a corporation of Delaware No Drawing. Application October 20, 1951
Serial No. 252,406

4 Claims. (Cl. 99—105)

This invention relates to beverages prepared from orange juice and has for its object to provide a beverage of this character which may be prepared in bulk and will not change in appearance, taste or otherwise when kept at room temperatures without refrigeration and exposed to the air for substantial periods of time.

It is common knowledge that orange juice, when freshly expressed from the fruit, begins to change in taste and color when exposed to the air in such a short time that in order to obtain the full fresh fruit flavor each portion must be prepared immediately before the drink is served. The only successful substitute for fresh orange juice heretofore developed is the concentrated and frozen or pasteurized orange juice and this product, like the fresh orange juice, suffers a change in taste unless consumed within a very short period after the normal liquid content of the juice is restored by the addition of water.

There have also been marketed with some success prepared orange drinks wherein sugar and lemon juice have been added to the diluted orange juice to compound a beverage in the nature of an orangeade having an orange flavor.

Such orangeades, while more or less popular as fountain drinks, do not have the vitamin "C" of freshly expressed orange juice, and although such beverages are marketed in hermetically sealed containers, such as cans or bottles, they are subject to rapid storage deterioration.

The object of the present invention is to provide an orange beverage which in color is indistinguishable from whole Valencia orange juice prepared by the addition of water to the frozen concentrate; whose vitamin "C" content is such that one twelve ounce portion provides the normal daily adult requirement; and which may be preserved unchanged in cans or bottles for extended periods without extenders or preservatives.

In carrying out our invention we prepare an orangeade according to the procedure heretofore followed by adding to the freshly expressed orange juice or the concentrated orange juice restored to normal concentration, a quantity of lemon juice in the order of about 12% of the orange juice; and sugar in the form of a syrup in quantity approximately 15 ounces of sugar per gallon of juice. To this juice and sugar mixture water is added in the proportion of 5 parts of water to 1 part of juice. To this mixture we add finely macerated pimiento in an amount of about ½ of 1% whole pimiento by weight. The pimiento ingredient is prepared by peeling fresh pimientos, grinding the peeled pimientos in a suitable mill and pressing the ground mash through a 200-mesh screen. Pimientos are substantially free of fibre and if properly peeled the entire pimiento can be pressed through the screen, forming a very finely divided mash. Pimientos have a vitamin "C" content approximately four times greater than oranges compared on an edible portion basis. Hence the addition of the pimiento mash substantially increases the vitamin content of the beverage. In fact with the added pimiento the total vitamin "C" content is sufficient for one twelve ounce drink to supply the daily adult requirement.

The pimiento mash also adds greatly to the keeping qualities of the beverage. The beverage prepared with the added pimiento mash does not change in taste or color on standing in unsealed containers for a matter of several days. Also, the prepared beverage will keep indefinitely in drums, cans or bottles with conventional crown caps when hermetically sealed and pasteurized.

The pimiento mash adds to the body of the drink and adds also a deeper shade of color to the beverage so that the beverage in color, vitamin content, sugar content and taste, is more nearly like freshly expressed orange juice than the orange drink as heretofore prepared without the added pimiento.

We claim:

1. A beverage comprising orange juice, water and macerated pimiento.
2. A beverage comprising orange juice, lemon juice, water and macerated pimiento.
3. A beverage comprising orange juice, sugar, water and macerated pimiento.
4. A beverage comprising orange juice, sugar and lemon juice, water and macerated pimiento.

References Cited in the file of this patent

Hiss, A. Emil: "The Standard Manual of Soda and Other Beverages," published 1897 by Engehard & Co., Chicago, pages 51, 80, 96 and 133.